US010958084B2

(12) United States Patent
Ehler et al.

(10) Patent No.: US 10,958,084 B2
(45) Date of Patent: Mar. 23, 2021

(54) CASCADABLE MULTI-CHARGER AND METHOD FOR THE OPERATION THEREOF

(71) Applicant: Drägerwerk AG & Co. KGaA, Lübeck (DE)

(72) Inventors: Björn Ehler, Lübeck (DE); Achim Volmer, Krummesse (DE); Martin Schulze, Bad Kleinen (DE); Jan Schöning, Lübeck (DE)

(73) Assignee: Drägerwerk AG & Co. KGaA, Lübeck (DE)

( * ) Notice: Subject to any disclaimer, the term of this patent is extended or adjusted under 35 U.S.C. 154(b) by 179 days.

(21) Appl. No.: 16/034,764

(22) Filed: Jul. 13, 2018

(65) Prior Publication Data

US 2019/0020204 A1   Jan. 17, 2019

(30) Foreign Application Priority Data

Jul. 14, 2017   (DE) .................... 10 2017 006 678.7

(51) Int. Cl.
*H02J 7/00*   (2006.01)
*H04B 10/114*   (2013.01)
*H02J 1/10*   (2006.01)
*H01M 10/42*   (2006.01)

(52) U.S. Cl.
CPC ............ *H02J 7/0026* (2013.01); *H02J 1/102* (2013.01); *H02J 7/0029* (2013.01); *H02J 7/0031* (2013.01); *H02J 7/00034* (2020.01); *H02J 7/0045* (2013.01); *H02J 7/00304* (2020.01); *H04B 10/1143* (2013.01);
(Continued)

(58) Field of Classification Search
CPC .... H02J 7/0026; H02J 7/00304; H02J 7/0031; H02J 7/0029; H02J 7/0045; H02J 1/102; H04B 10/1143
USPC ........................................................ 320/112
See application file for complete search history.

(56) References Cited

U.S. PATENT DOCUMENTS 3,659,114 A * 4/1972 Polenz ...................... H02J 3/14
307/52
4,471,232 A * 9/1984 Peddie .............. H02J 13/00009
307/35

(Continued)

FOREIGN PATENT DOCUMENTS

JP    2014073065 A  *  4/2014
KR    20140091921 A  *  7/2014
WO    2013/099229 A2    7/2013

*Primary Examiner* — John T Trischler
(74) *Attorney, Agent, or Firm* — McGlew and Tuttle, P.C.

(57) ABSTRACT

A charging device, for charging a battery pack, can be combined with other charging devices to form a multi-charger. The charging device has an input-side contact element for a power cable or an additional charging device connection. Internally, the charging device has conductors for the electrically conductive connection of the input-side contact element to an output-side contact element and for looping through a power supply voltage in contact with the input-side contact element. A charging device circuit of the charging device is internally connected to the looped-through supply voltage. The charging device circuit includes an input side voltage converter and a charging controller for charging a battery pack. The supply voltage can be converted by the voltage converter into a supply voltage for feeding the charging controller.

20 Claims, 4 Drawing Sheets

(52) U.S. Cl.
CPC ........ *H01M 10/4257* (2013.01); *H02J 7/0024* (2013.01); *H02J 7/0036* (2013.01); *Y10S 320/10* (2013.01)

(56) References Cited

U.S. PATENT DOCUMENTS

| | | | | |
|---|---|---|---|---|
| 5,752,046 A * | 5/1998 | Oprescu | ............... | G06F 1/26 713/300 |
| 6,404,163 B1 * | 6/2002 | Kapsokavathis | ....... | H02J 7/008 320/104 |
| 6,453,014 B1 * | 9/2002 | Jacobson | ................. | H04L 1/24 379/26.01 |
| 6,483,272 B1 * | 11/2002 | Terada | ..................... | H02J 7/02 320/103 |
| 6,489,743 B1 * | 12/2002 | Alzieu | ................. | H02J 7/0024 320/102 |
| 6,611,917 B1 * | 8/2003 | Yahara | .................... | G06F 1/263 713/320 |
| 6,771,044 B1 * | 8/2004 | Vinciguerra | ............ | H02J 9/061 320/116 |
| 6,825,771 B2 * | 11/2004 | Bruno | ................... | H02H 1/0038 340/636.1 |
| 7,032,119 B2 * | 4/2006 | Fung | ...................... | G06F 1/3203 713/320 |
| 7,045,990 B2 * | 5/2006 | Takimoto | ............... | H02J 7/0031 320/134 |
| 7,236,087 B2 * | 6/2007 | Vasquez | ................. | G06Q 10/02 320/130 |
| 7,305,291 B2 * | 12/2007 | Koenig | ................... | H01M 10/48 363/35 |
| 7,474,079 B2 * | 1/2009 | Hashimoto | ............. | H02J 7/022 320/138 |
| 7,759,908 B2 * | 7/2010 | LeMay | ............... | H02J 7/00038 320/166 |
| 7,895,455 B2 * | 2/2011 | Green | ....................... | G06F 1/26 713/300 |
| 7,986,124 B2 * | 7/2011 | Stone | .................... | H02J 7/0016 320/106 |
| 7,986,889 B2 * | 7/2011 | Hamaya | ............ | G03G 15/0283 399/31 |
| 8,093,749 B1 * | 1/2012 | Lew | ......................... | H05K 7/20 307/29 |
| 8,154,257 B2 * | 4/2012 | Hori | .................... | H01M 10/441 320/126 |
| 8,188,708 B2 * | 5/2012 | Altekruse | ............. | H01F 27/325 320/108 |
| 8,319,478 B2 * | 11/2012 | Humphrey | ............ | B60L 3/0069 320/138 |
| 8,358,102 B2 * | 1/2013 | Rivers, Jr. | .................. | H02J 3/14 320/107 |
| 8,378,519 B2 * | 2/2013 | Bradford | ................... | H02J 1/14 307/141 |
| 8,587,261 B2 * | 11/2013 | Sassen | .................. | H02J 7/0027 320/115 |
| 8,629,581 B2 * | 1/2014 | Rutkowski | ........ | H01M 10/4207 307/125 |
| 8,643,330 B2 * | 2/2014 | Nergaard | .................. | H02J 7/0027 320/109 |
| 8,705,671 B2 * | 4/2014 | Ameti | ..................... | G01S 5/0221 375/345 |
| 8,766,594 B2 * | 7/2014 | Gotz | ..................... | B60L 53/305 320/109 |
| 8,810,198 B2 * | 8/2014 | Nergaard | ................ | B60L 53/14 320/109 |
| RE45,208 E * | 10/2014 | Humphrey | ............ | B60L 3/0069 320/138 |
| 8,994,338 B2 * | 3/2015 | Khan | ..................... | B60L 53/14 320/138 |
| 9,160,183 B2 * | 10/2015 | Paczkowski | ........... | H02J 7/0045 |
| 9,164,560 B2 * | 10/2015 | Templeton | ................ | H02J 1/10 |
| 9,248,752 B2 * | 2/2016 | Kuribayashi | ....... | H02J 13/0006 |
| 9,400,314 B2 * | 7/2016 | Humphrey | ............. | G01R 31/40 |
| 9,436,261 B2 * | 9/2016 | Yun | ....................... | G06F 1/3212 |
| 9,525,293 B2 * | 12/2016 | Ito | ............................ | H02J 50/10 |
| 9,537,336 B2 * | 1/2017 | Suzuki | .................. | H02J 7/0021 |
| 9,543,774 B2 * | 1/2017 | Volmer | .................... | A42B 3/30 |
| 9,735,578 B2 * | 8/2017 | Yoshiguchi | ............... | H02J 3/14 |
| 9,742,206 B2 * | 8/2017 | Ohtsuki | ................. | H02J 7/0022 |
| 9,762,069 B2 * | 9/2017 | Bourilkov | ............ | H02J 7/0068 |
| 9,796,347 B2 * | 10/2017 | Packwood | ............. | B60R 16/03 |
| 9,804,248 B2 * | 10/2017 | Hase | .................... | G01R 31/396 |
| 9,806,543 B2 * | 10/2017 | Radford | ............... | H02J 7/00043 |
| 9,806,544 B2 * | 10/2017 | Blyde | ................... | H02J 7/0027 |
| 9,866,046 B2 * | 1/2018 | Ito | .............................. | H02J 5/00 |
| 9,917,450 B2 * | 3/2018 | Volmer | .................. | H01M 10/46 |
| 10,190,590 B2 * | 1/2019 | Volmer | ................. | A62B 17/006 |
| 10,312,709 B2 * | 6/2019 | Shin | ......................... | H02J 7/00 |
| 10,409,237 B2 * | 9/2019 | Hegewald | ............. | G06Q 10/20 |
| 10,436,875 B2 * | 10/2019 | Ameti | ................. | H04W 40/246 |
| 10,454,414 B2 * | 10/2019 | Lee | ......................... | H02S 40/32 |
| 10,476,284 B2 * | 11/2019 | Suzuki | .................... | H02J 50/80 |
| 10,513,189 B2 * | 12/2019 | Takehara | .............. | B60L 53/66 |
| 10,574,078 B2 * | 2/2020 | Matsukawa | ............ | H02J 50/10 |
| 2003/0090239 A1 * | 5/2003 | Sakakibara | ........... | H02J 7/0071 320/166 |
| 2003/0102968 A1 * | 6/2003 | Bruno | .................. | H02H 1/0038 340/531 |
| 2004/0070369 A1 * | 4/2004 | Sakakibara | ............... | B25F 5/00 320/128 |
| 2004/0227617 A1 * | 11/2004 | Vasquez | .................. | G06Q 10/02 340/7.2 |
| 2005/0017676 A1 * | 1/2005 | Takimoto | ............... | H02J 7/0031 320/107 |
| 2005/0062456 A1 * | 3/2005 | Stone | .................... | H02J 7/0016 320/116 |
| 2006/0030972 A1 * | 2/2006 | Schlueter | .................. | H02J 3/00 700/292 |
| 2006/0052922 A1 * | 3/2006 | Koenig | ................. | H01M 10/48 701/36 |
| 2006/0113956 A1 * | 6/2006 | Bublitz | ................. | H02J 7/0013 320/112 |
| 2006/0176021 A1 * | 8/2006 | Krause | .................. | H02J 7/0027 320/128 |
| 2007/0114969 A1 * | 5/2007 | Marmaropoulos | ....... | H02J 5/00 320/108 |
| 2007/0223722 A1 * | 9/2007 | Merrey | .................. | H04R 27/00 381/77 |
| 2007/0229028 A1 * | 10/2007 | Hashimoto | ............. | H02J 7/022 320/114 |
| 2007/0252552 A1 * | 11/2007 | Walrath | .................... | G06F 1/26 320/107 |
| 2007/0273307 A1 * | 11/2007 | Westrick | ................ | H05B 47/18 315/312 |
| 2008/0157714 A1 * | 7/2008 | LeMay | ................. | H02J 7/0042 320/107 |
| 2008/0291879 A1 * | 11/2008 | Duff | ...................... | H02J 7/0068 370/338 |
| 2009/0010661 A1 * | 1/2009 | Hamaya | ............ | G03G 15/0283 399/37 |
| 2009/0066288 A1 * | 3/2009 | Altekruse | ............. | H02J 7/0042 320/107 |
| 2009/0066289 A1 * | 3/2009 | Vogel | ........................ | H02J 7/00 320/107 |
| 2009/0066290 A1 * | 3/2009 | Altekruse | ............. | H01F 27/325 320/108 |
| 2010/0019735 A1 * | 1/2010 | Hori | .................... | H01M 10/441 320/162 |
| 2010/0295503 A1 * | 11/2010 | Bourilkov | ............. | H02J 7/0068 320/106 |
| 2010/0315045 A1 * | 12/2010 | Zeine | ..................... | H02J 50/70 320/137 |
| 2011/0031929 A1 * | 2/2011 | Asada | ..................... | B60L 53/14 320/109 |
| 2011/0077809 A1 * | 3/2011 | Leary | ..................... | B60L 53/65 701/22 |
| 2011/0115291 A1 * | 5/2011 | Bradford | ................... | H02J 1/14 307/23 |
| 2012/0014278 A1 * | 1/2012 | Ameti | ..................... | G01S 5/0221 370/252 |

(56) References Cited

U.S. PATENT DOCUMENTS

| | | | | |
|---|---|---|---|---|
| 2012/0014484 A1* | 1/2012 | Ameti | H04W 40/246 | 375/345 |
| 2012/0038324 A1* | 2/2012 | Humphrey | B60L 3/0069 | 320/138 |
| 2012/0056583 A1* | 3/2012 | Gotz | B60L 53/305 | 320/109 |
| 2012/0075397 A1* | 3/2012 | Mistyurik | B41J 3/36 | 347/109 |
| 2012/0126743 A1* | 5/2012 | Rivers, Jr. | B60L 53/65 | 320/107 |
| 2012/0181983 A1* | 7/2012 | Khan | H02J 2207/40 | 320/109 |
| 2012/0235636 A1* | 9/2012 | Partovi | H02J 50/90 | 320/108 |
| 2012/0306434 A1* | 12/2012 | Sassen | H02J 7/0027 | 320/107 |
| 2013/0057209 A1* | 3/2013 | Nergaard | B60L 53/63 | 320/109 |
| 2013/0057210 A1* | 3/2013 | Nergaard | H02J 7/0027 | 320/109 |
| 2013/0293013 A1* | 11/2013 | Templeton | H02J 1/10 | 307/64 |
| 2013/0314043 A1* | 11/2013 | Bouman | B60L 53/60 | 320/109 |
| 2014/0002010 A1* | 1/2014 | Paczkowski | H02J 7/0042 | 320/107 |
| 2014/0082829 A1* | 3/2014 | Volmer | H02H 7/10 | 2/410 |
| 2014/0129164 A1* | 5/2014 | Gorbold | G01R 31/3835 | 702/63 |
| 2014/0159495 A1* | 6/2014 | Nassar | H02J 7/0068 | 307/71 |
| 2014/0312831 A1* | 10/2014 | Lewis | B60L 11/1822 | 320/107 |
| 2014/0361740 A1* | 12/2014 | Suzuki | H02J 50/40 | 320/108 |
| 2014/0365792 A1* | 12/2014 | Yun | H02J 7/00036 | 713/320 |
| 2015/0015205 A1* | 1/2015 | Ito | H02J 7/02 | 320/113 |
| 2015/0045978 A1* | 2/2015 | Yoshiguchi | H02J 3/14 | 700/295 |
| 2015/0163093 A1* | 6/2015 | Radford | H02J 7/00043 | 709/220 |
| 2015/0180246 A1* | 6/2015 | Roth | H02J 7/0044 | 320/115 |
| 2015/0180270 A1* | 6/2015 | Takano | H04B 5/0031 | 320/103 |
| 2015/0191134 A1* | 7/2015 | Packwood | B60R 16/03 | 307/9.1 |
| 2015/0280462 A1* | 10/2015 | Ohtsuki | H02J 7/0021 | 320/116 |
| 2016/0087472 A1* | 3/2016 | Sattinger | H02J 7/022 | 320/108 |
| 2016/0299479 A1* | 10/2016 | Hegewald | G01N 33/0006 | |
| 2016/0372944 A1* | 12/2016 | Volmer | H02H 9/008 | |
| 2017/0047748 A1* | 2/2017 | Blyde | H02J 7/0021 | |
| 2017/0070067 A1* | 3/2017 | Suzuki | H02J 7/025 | |
| 2017/0070068 A1* | 3/2017 | Ito | H02J 7/0021 | |
| 2018/0026467 A1* | 1/2018 | Shin | H02J 7/0068 | 320/107 |
| 2018/0041160 A1* | 2/2018 | Lee | H02J 13/00019 | |
| 2018/0123361 A1* | 5/2018 | Gray | H02J 7/025 | |
| 2018/0244163 A1* | 8/2018 | Takehara | B60K 1/04 | |
| 2018/0354436 A1* | 12/2018 | Sato | H02J 7/0034 | |
| 2019/0115779 A1* | 4/2019 | Jang | H02M 3/33576 | |
| 2019/0181671 A1* | 6/2019 | Matsukawa | H01M 10/44 | |
| 2019/0280502 A1* | 9/2019 | Hsieh | H04L 67/10 | |
| 2019/0334362 A1* | 10/2019 | Sheng | H02J 7/0068 | |

\* cited by examiner

CASCADABLE MULTI-CHARGER AND METHOD FOR THE OPERATION THEREOF

CROSS REFERENCE TO RELATED APPLICATIONS

This application claims the benefit of priority under 35 U.S.C. § 119 of German Application 10 2017 006 678.7, filed Jul. 14, 2017, the entire contents of which are incorporated herein by reference.

TECHNICAL FIELD

The present invention pertains to a modularly expandable (cascadable) charging device for recharging interconnected electrical storage cells in the form of battery packs, batteries and the like, designated below in summary briefly as battery packs. Furthermore, the present invention also pertains to a charging device comprised by such a charging device as well as to a method for the operation of such a charging device.

BACKGROUND

Portable battery-operated devices have become established as the current standard in many areas of life. Rechargeable battery packs have a great significance especially for devices with high power input. These include power tools (lights, blowers and the like). Because users need equipment that is ready for use again in ever shorter times, fast-charging methods, which make it possible to carry out a full charging of the respective battery pack or battery packs within a range of 15 minutes, are often used in charging devices.

Charging devices for recharging at least one battery pack are known per se and are usually designated, as well as below, as charging devices. Prior-art charging devices are technically divided into two parts, in particular a network part and a charging controller. The network part functions as an interface to the feeding power grid and converts the power supply mostly into a low d.c. voltage (10-20 V). The charging controller generates a charging voltage and sets a charging current from the d.c. voltage that is provided by the network part corresponding to a respective charging process. Moreover, the charging controller monitors the charging process and the at least one battery pack during the charging process.

While a charging device and potentially a plurality of battery packs are often used for one device in private life, battery-operated devices are often kept in good condition and maintained centrally by an equipment maintenance staff in the professional environment. This also includes the charging of the battery packs. Especially when it is personal protective equipment or surveillance technology, it is essential that the repair of the devices and thus also the recharging of the respective battery packs be carried out with the greatest care. Unclear buildups may easily occur during the use of many single charging devices. It is then not recognizable, for example, whether the network part of a charging device is possibly connected to the feeding power grid or not. The battery pack or each battery pack connected to this charging device is not charged without a correct connection of the network part. At least one device is then unexpectedly not ready for use.

Therefore, users and equipment maintenance staff often desire charging devices which can not only charge a battery pack, but also a plurality of battery packs. Such multi-chargers have in a housing a central network part as well as a plurality of slots or the like for receiving a battery pack each. In addition, multi-chargers with a central network, on which individual charging trays can be lined up in a modular manner for the reception of a battery pack each, are also known. The supply of energy is looped through (passed through) the individual charging trays as low voltage supplied by the network part and each charging tray has its own charging controller. Such a device is known, for example, from WO 2013/099229 A2.

When high-energy battery packs shall be charged within a short time, prior-art multi-chargers reach their limits. For example, a battery pack with 72 Wh needs a charging device having a network part with an output of about 60 W, when a charging time of about 3 hours shall be reached. Should it be desired to line up five charging trays on a common network part, a network part with an output of 300 W is necessary. In case of a d.c. voltage of 15 V from the network part, the electrically conductive connection to and between the charging trays must be configured for a current of 20 A (current load capacity). In addition to conductors, and in particular bus bars, with correspondingly dimensioned conductor cross sections, this also requires correspondingly dimensioned and thus large-volume plug-in connectors between the individual charging trays that can be lined up. This in turn leads to high costs and to poor integrability.

SUMMARY OF THE INVENTION

One object of the present invention is to provide a device that is designated here and below briefly as multi-charger, as well as modular charging devices usable therein for recharging battery packs, which avoid the drawbacks outlined above or at least reduce the consequences thereof.

According to the present invention, this object is accomplished by means of a multi-charger with a charging device according to the invention. For this, the following provisions are made in a charging device for charging a battery pack:

The charging device has an input-side contact element, which makes possible either the connection of a power cable or the connection of an additional charging device. The charging device has internally conductors for the electrically conductive connection of the input-side contact element to an output-side contact element and for looping through (passing through) a power supply voltage $U_V$ in contact with the input-side contact element. A charging device circuit of the charging device is internally connected to the power supply voltage Uv, wherein the charging device circuit comprises a voltage converter as well as a charging controller for charging a battery pack on the input side. The power supply voltage $U_V$ can be converted within the charging device by means of the voltage converter into a supply voltage for feeding the charging controller and is converted into such a supply voltage during the operation of the charging device.

Furthermore, provisions are made in such a charging device for the output-side contact element of the charging device to be able to be connected in an electrically conductive manner to the input-side contact element of another charging device (and vice versa).

Finally, provisions are made for each charging device to have devices for the transmission and the analysis of a signal, which codes information on the position of the charging device in the line of charging devices (position information). In this respect, each charging device has devices for the transmission of a signal, which codes, for example, the number of upstream charging devices preceding the charging device in a line of charging devices on the input side as position information. Furthermore, each charging device has devices for the comparison of the position or number coded by the signal with a predefined or predefinable limit value and for the automatic deactivation of the charging device (charging tray) upon reaching the limit value.

In case of a method for the operation of such a charging device, each charging device transmits a signal, which codes position information, i.e., for example, a number of charging devices preceding the charging device in the line of charging devices on the input side, to a charging device connected to the output side thereof, and each charging device compares the position or number coded by the signal with a predefined or predefinable limit value and is deactivated upon reaching the limit value. In this manner, it is ensured that no limit values (current load capacity) are exceeded especially in relation to a first charging device in the line of charging devices and/or a sum of the contact resistances is not exceeded in relation to all charging devices in the line of charging devices. The limit value in question codes the maximum number of charging devices permissible to this extent in a line of charging devices.

While the input-side contact element of a charging device is intended for connection of a power cable or an additional charging device, at least one additional charging device can be connected to a charging device, so that a system of charging devices (system of charging devices) is obtained. A power supply voltage $U_V$ led to a charging device by means of the power cable can be led through to an additional charging device and each additional charging device connected to the charging device and is led through during the operation of the charging device or of the charging devices. Each charging device comprises for this purpose contact elements and, internally, conductors between the contact elements, by means of which this leading through looping through or passing through can be brought about and is brought about during the operation. Because the power supply voltage $U_V$ rather than a low voltage generated by a central network part is looped through according to the invention, the needed current is lower. The result of this is correspondingly lower necessary conductor cross sections for the connection within the charging device of the input-side contact element to the output-side contact element. This also allows, for example, the use of conventional IEC power connectors and IEC sockets as input-side and output-side contact elements. Overall, this results in a considerably simplified configuration.

Another advantage of the invention is that the charging device, and each individual charging device in case of a plurality of charging devices combined with one another in a modular manner, has its own voltage converter, which generates a supply voltage from the power supply voltage $U_V$ for feeding the charging controller of the charging device. A charging device can thus be operated individually for charging precisely one battery pack, but also combined with additional charging devices for the simultaneous charging of a plurality of battery packs. An adaptation to a particular operating situation (single charging device or system of charging devices) is not necessary. In addition, no separate network part is needed, because the voltage converter of the charging device circuit functions as a local network part of each charging device.

Yet another advantage of the invention is that a charging device (each charging device) can be connected directly to another charging device, by the output-side contact element thereof contacting the input-side contact element of a respective other charging device. This results in a system of charging devices that can be lined up in a modular manner. Precisely one charging device of the system can be connected to the feeding network and will be connected to the feeding network during the operation. This charging device is the first charging device of the system. Possible additional charging devices are successively connected to this charging device, by an additional charging device (second charging device) being connected to this charging device, to which an additional charging device (third charging device) is connected, etc. This then results in a line of charging devices comprising at least two charging devices.

A special advantage of the charging device, in which each charging device has devices for the transmission and analysis of a signal which codes information on the position of the charging device in the line of charging devices (position information), as well as of the method for the operation of such a charging device is that each charging device automatically determines its position in the respective line of charging devices and thus determines how many charging devices preceding on the input side (predecessors) the line of charging devices already comprises. Thus, the number of charging devices can be limited in a simple and reliable manner and the line of charging devices comprises electrically never more than the number of permissible charging devices determined by the limit value.

The operation of the multi-charger and of each charging device is carried out automatically, i.e., without a special intervention of the user, under the control of a respective microcontroller or a comparable processing unit of each charging device. Each microcontroller executes a control program that determines the function of the charging device during the operation. In this respect, the present invention is implemented in software or in firmware. A special aspect of the invention is thus, on the one hand, also a control program with program code instructions executable by the microcontroller, and, on the other hand, a data storage device with such a control program, i.e., a computer program product with program code devices, as well as finally also a charging tray with a microcontroller and with a control program loaded in a memory of the microcontroller.

In an advantageous embodiment of the charging device, this charging device comprises, on the one hand, a signal transmitter for the wireless transmission of the signal coding position information, especially the number of predecessors in the line of charging devices, to a charging device (successor) which is connected on the output side and a signal receiver for the wireless reception of a signal transmitted from a charging device connected on the input side, on the other hand. The wireless transmission of the signal is especially uncomplicated since no additional mechanical contact elements are needed. The wireless transmission of the signal is preferably carried out by means of infrared transmitters and infrared receivers of adjacent charging devices (predecessors and successors) interacting with each other in pairs. The wireless transmission of the signal as infrared signal by means of infrared transmitters and infrared receivers is insensitive to electromagnetic interferences or the like, which may arise, for example, in connection with the charging of a plurality of battery packs.

In yet another embodiment of the charging device, a charging controller comprised by the charging device can be automatically deactivated for the deactivation thereof and is automatically deactivated during the operation for deactivation of the charging device. Deactivation takes place automatically on the basis of the result of the comparison of the position information with the limit value. If the position information received reaches or exceeds the limit value, the automatic deactivation of the charging device is triggered. It is then ensured that a battery pack connected to a charging device is not charged and the power supply voltage $U_V$ looped through up to the respective charging device is not loaded by the charging of the battery pack. The power input of a multi-charger in the form of a plurality of charging devices connected to one another is thus limited effectively to an upper limit defined by the respective limit value.

In an alternative or additional embodiment of the charging device, a charging controller status display comprised by the charging device can be activated for signaling an error situation for the deactivation thereof and is automatically activated during the operation for the deactivation of the charging device. Deactivation takes place semi-automatically on the basis of the result of the comparison of the position information with the limit value. If the position information received reaches or exceeds the limit value, the automatic activation of the charging controller status display is triggered. The exceeding of the number of allowable charging devices is signaled to the user of the charging device in a simple and directly understandable manner by means of the charging controller status display activated for signaling an error situation and, for example, blinking for this. The user can then remove the respective charging device from the line of charging devices and thus limit the number of charging devices to a permissible extent.

In a preferred embodiment of the charging device, the charging controller which is comprised by the charging device can be automatically deactivated for the deactivation thereof and at the same time the charging controller status display thereof can be automatically activated for signaling an error situation and they are deactivated and activated, respectively, automatically and at the same time during the operation. An intervention of the user in the form of removing a charging device is then not necessary and the user is still informed about the exceeding of the number of permissible charging devices.

In yet another embodiment of the charging device, this charging device comprises a microcontroller as well as a signal transmitter and a signal receiver as devices for carrying out the method outlined above and described below with more details, wherein a signal, which can be sent by means of the signal transmitter and codes the position of the charging device in the line of charging devices, can be generated by means of the microcontroller, wherein a signal received by means of the signal receiver from a preceding charging device for reception of the coded position and for comparison with the limit value can be analyzed by means of the microcontroller and is correspondingly analyzed during the operation. Depending on the result of the analysis, the automatic deactivation of the charging device, especially in the form of the deactivation of the charging controller described above and/or of the activation of the charging controller status display, is possibly carried out by the microcontroller.

An exemplary embodiment of the present invention will be explained in more detail below on the basis of the drawings. Subjects of components corresponding to one another are provided with the same reference numbers in all figures.

The exemplary embodiment or each exemplary embodiment is not to be understood as a limitation of the present invention. Rather, variations and modifications are possible within the framework of the present disclosure, especially such variants and combinations, which may become apparent to the person skilled in the art with respect to accomplishing the object and lead to a novel subject due to combinable features, for example, due to a combination or a modification of individual features described in conjunction with the features in the general or specific section of the specification as well as contained in the claims and/or the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
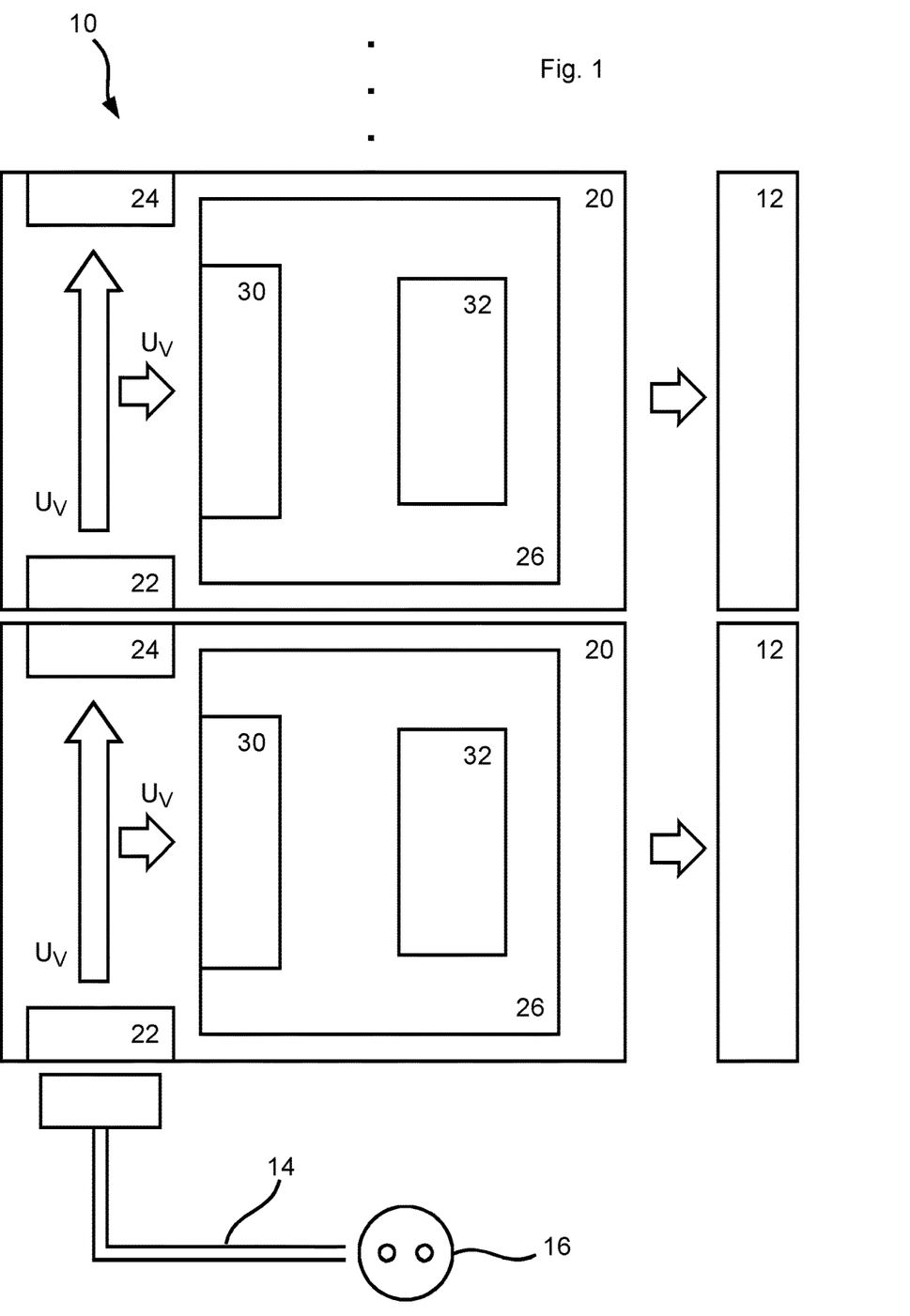
FIG. 1 is a block diagram of a multi-charger with a plurality of individual charging devices (charging trays) for charging a battery pack each.

Referring to the drawings, FIG. 1 shows in the form of a block diagram in a schematically simplified manner an embodiment of a modular device, which is designated here and below as a multi-charger 10, for charging at least one battery pack 12 or for the simultaneous charging of a plurality of battery packs 12. This device is connected to a feeding network 16 by means of a power cable 14.

In a configuration for the simultaneous charging of a plurality of battery packs 12, the multi-charger 10 comprises a plurality of modules, which can be lined up, are similar and each function as a charging device 20, which are designated below as charging trays 20. A battery pack 12 each can be charged by means of each charging device 20 or of each charging tray 20 during the operation. The minimal configuration is one charging tray 20. A multi-charger 10 is formed by at least two charging trays 20 being combined by lining up.

A tray-shaped (in the broadest sense) configuration of the charging tray 20 for reception of a battery pack 12 represents only one optional embodiment. Nevertheless, the designation of the devices which can be lined up next to one another in a modular manner for charging a battery pack 12 each (charging device) as charging trays 20 and individually as charging trays 20 is retained, however, without dispensing with a further general validity. Correspondingly, the general wording of device for charging a battery pack 12 or charging device 20 is always to be read in each use of the designation charging tray 20.

The view in FIG. 1 shows a multi-charger 10 comprising two charging trays 20. A first charging tray 20 is connected to the feeding network 16 and the power supply voltage $U_V$ thereof. A second charging tray 20 is connected to this first charging tray 20.

For this purpose, each charging tray 20 basically has electrical contact elements 22, 24, which are known per se. For example, a so-called IEC power connector 22 and a matching IEC socket 24 are provided as contact elements 22, 24. Each charging tray 20 has, for example, an IEC power connector 22 on an input side and an IEC socket 24 on an output side. A matching contact element of the power cable 14 can be connected to the input-side contact element 22, especially to the IEC power connector 22. The first charging tray 20 can be connected to the network 16 or is connected to the network 16 by such a connection of a power cable 14 connected to the network 16. An additional charging tray 20 can be connected to the output-side contact element 24, especially the IEC socket 24. For this, the input-side contact element 22, i.e., for example, an IEC power connector 22, of the additional charging tray 20 is connected to the output-side contact element 24. In this way, an additional charging tray 20 is connectable (can be lined up, cascadable) to a charging tray 20 and an additional charging tray 20 is connectable (can be lined up, cascadable) to this charging tray, etc. This results in a system that can be lined up.

A plurality of charging trays 20 connected to one another results in a line of charging trays 20 (line of charging trays; line of charging devices). The power supply voltage $U_V$ is looped through—passed through—the individual charging trays 20 here. This is shown in the view in FIG. 1 in a schematically simplified manner in the form of vertical block arrows which are denoted by $U_V$. Each charging tray 20 comprises corresponding conductors for looping through the power supply voltage $U_V$. Because the power supply voltage $U_V$ rather than a low voltage is looped through in the invention proposed here, the current needed to be transmitted via the conductors within the charging devices is lower, so that correspondingly lower necessary conductor cross sections arise as a result.

The looped-through power supply voltage $U_V$ is, for example, in the range of 90 VAC to 265 VAC. A charging tray circuit (charging device circuit) 26 each is connected to the looped-through power supply voltage $U_V$ in each charging tray 20. This is shown in the view in FIG. 1 in a schematically simplified manner in the form of the horizontal block arrows starting from the vertical block arrows and pointing to a respective charging tray circuit 26 and likewise denoted by $U_V$.

The charging tray circuit 26 of each charging tray 20 comprises a voltage converter 30 on the input side (for the looped-through power supply voltage $U_V$) and a charging controller 32 electrically connected in series to the voltage converter 30.

At least one battery pack 12 can be connected in at least an electrically conductive manner to each charging tray 20 for charging. The charging tray 20 preferably has a receiving slot or the like in at least some sections for the positive-locking reception of a battery pack 12 each. Such a receiving slot or the like guarantees a mechanically secure hold of the respective battery pack 12 in relation to the charging tray 20 and brings about a guiding and adjusting of contact elements in a manner that is basically known per se for the electrically conductive contacting of the battery pack 12. This is shown in the view in FIG. 1 in a schematically simplified manner in the form of the horizontal block arrow pointing from the charging tray 20 to a respective battery pack 12. The charging of a battery pack 12 by means of the charging controller 32 of the respective charging tray 20 takes place in a manner that is basically known per se and is not paramount here. The electrically conductive contacting of the battery pack 12 likewise takes place in a manner that is basically known per se.

Figure 2:
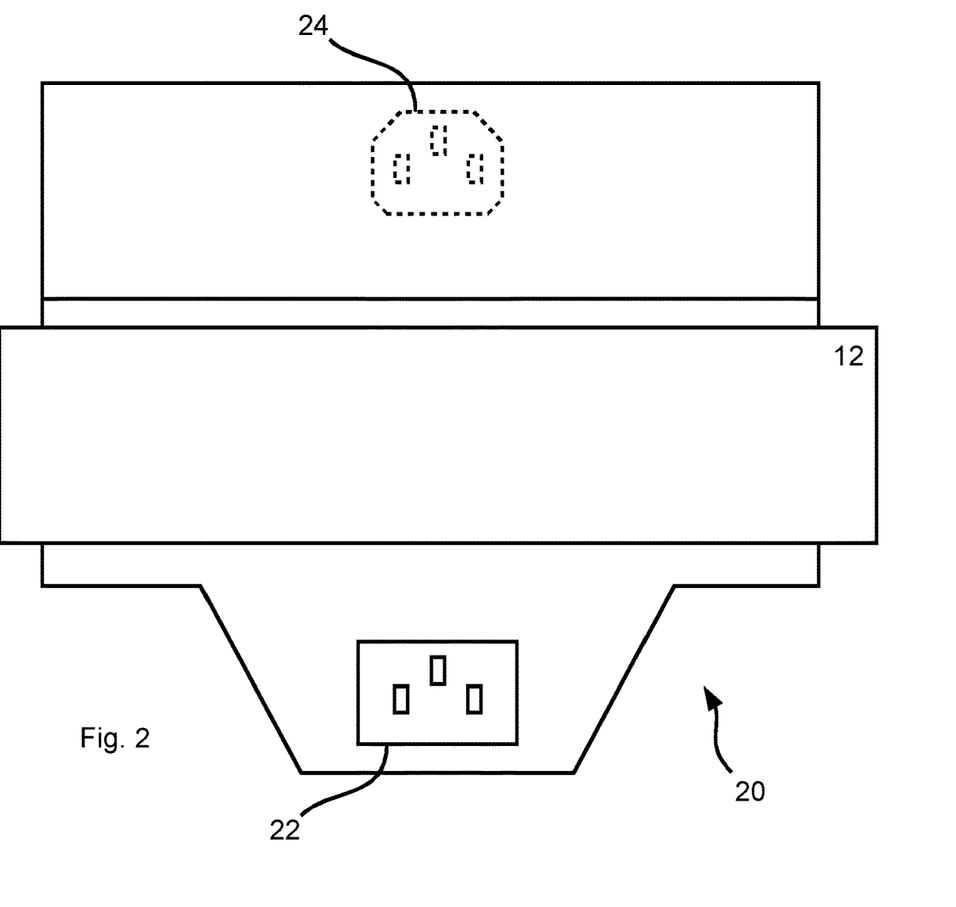
FIG. 2 is a top view of a single charging device.
Figure 3:
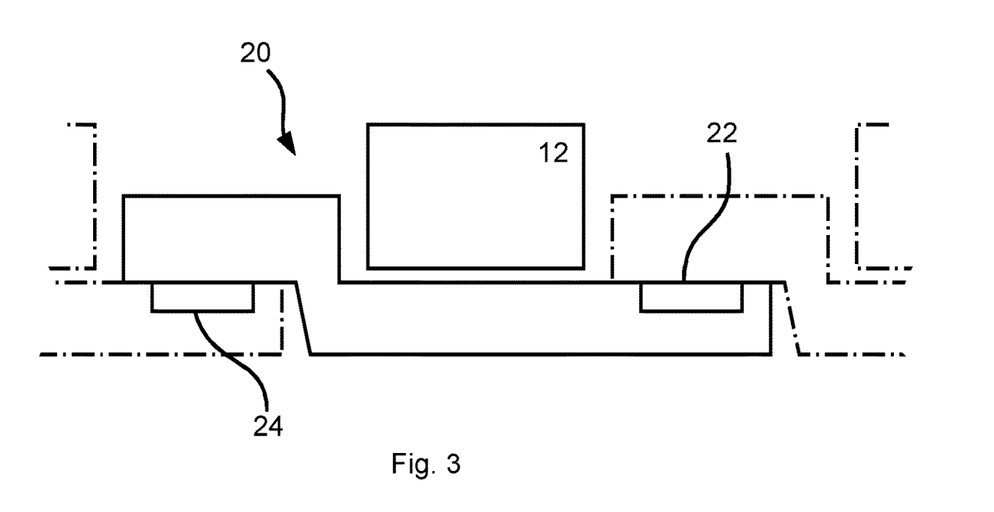
FIG. 3 is a lateral view of a charging device according to FIG. 2.

The view in FIG. 2 shows an embodiment of the charging tray 20 in a top view with a battery pack 12 placed in the charging tray 20 for charging. The view in FIG. 3 shows the charging tray 20 according to FIG. 2 in a lateral view and—with dash-dotted line—on the right and on the left sides next to the charging tray 20, a respective additional charging tray 20 connected to same (lined up). An IEC power connector 22 as input-side contact element 22 is shown in the view in the top view (FIG. 2). An IEC socket 24 functioning as output-side contact element 24 is covered by the housing of the charging tray 20 and is correspondingly shown with dashed lines. In the view in the lateral view (FIG. 3), it can be seen that the housing of the charging tray 20 has a step profile. The output-side contact element 24 of the charging tray 20 is connected to the input-side contact element 22 of the additional charging tray 20 for the electrically conductive connection of a charging tray 20 to an additional charging tray 20. This guarantees an electrically conductive connection. Depending on the embodiment of the contact elements 22, 24, this connection also guarantees a mechanical connection of the charging trays 20.

Instead of an IEC power connector 22 on the input side of each charging tray 20, an IEC socket 24 and correspondingly an IEC power connector 22 on the output side may be provided in the same way. Instead of IEC power connectors 22 and IEC sockets 24, other contact elements 22, 24 matching in pairs may be provided.

Figure 4:
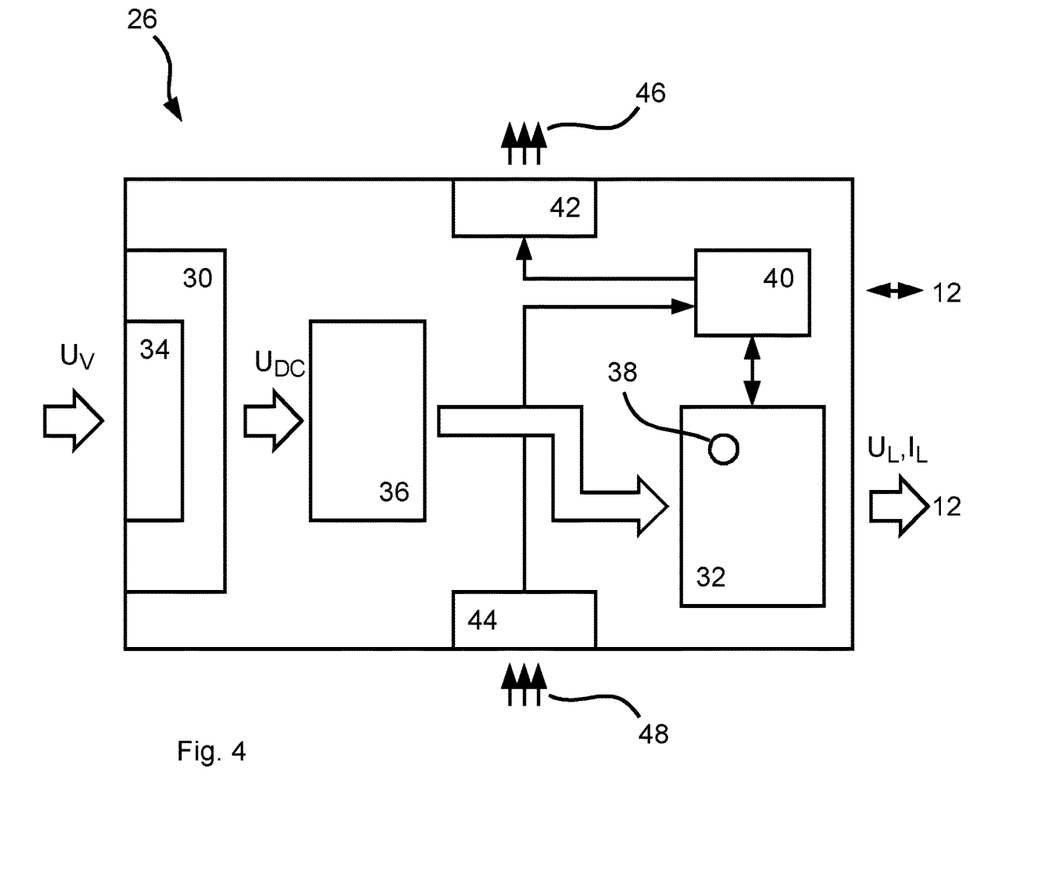
FIG. 4 is a block diagram of a charging device circuit of a charging device.

The view in FIG. 4 shows the charging tray circuit 26 of a charging tray 20 with additional details. The voltage converter 30 optionally comprises for protection a so-called precharging circuit (inrush current limiter) 34 or such a precharging circuit 34 is arranged upstream of the voltage converter 30. A combinational switching circuit (switched-mode power supply), which is basically known per se, preferably functions as the voltage converter 30. To obtain lower emission values in the emission of electromagnetic interferences, provisions are optionally made to use the protective ground wire as functional grounding, which is likewise looped through at least then parallel to the conductors for looping through the power supply voltage $U_V$. Interfering currents are then diverted to ground via the protective ground wires. The voltage converter 30 generates a low voltage from the power supply voltage $U_V$ as supply voltage for feeding the charging controller 32, for example, a d.c. voltage UDC at a level of 16 V.

The d.c. voltage UDC is fed to the charging controller 32 via an optional explosion protection circuit 36. This charging controller 32 generates a charging voltage $U_L$ and a charging current $I_L$. The charging voltage $U_L$ and the charging current $I_L$ are discharged to a battery pack 12 connected to the charging tray 20. A charging controller status display 38 is provided for the display of a status of the charging controller 32.

A microcontroller 40 comprised by the charging tray circuit 26 controls and/or monitors the charging controller 32 and determines the charging voltage $U_L$ and the charging current $I_L$ as a function of a monitoring of the battery pack 12 connected to the charging tray 20. A data exchange takes place between the microcontroller 40 and the respective battery pack 12 in a manner that is basically known per se for monitoring the battery pack 12. This is illustrated by the horizontal double arrow pointing from the microcontroller 40 to the battery pack 12 in the view in FIG. 4.

Furthermore, the microcontroller 40 controls and monitors a signal transmitter 42 comprised by the charging tray circuit 26 in the embodiment shown here as well as a signal receiver 44 comprised by the charging tray circuit 26. The signal transmitter 42 is intended and set up (configured) for transmitting signals 46 in a wireless manner. The signal transmitter 42 is, for example, an infrared transmitter 42 emitting infrared signals 46. The signal receiver 44 is intended and set up for receiving signals 48 in a wireless manner. The signal receiver 44 is, for example, an IR receiver 44 receiving infrared signals 48.

The signal transmitter 42 and the signal receiver 44 as well as the microcontroller 40 controlling and monitoring both function as devices for detecting the number of charging trays 20 comprised by the line of charging devices. Due to the monitoring of the number of charging trays 20, resulting electrical resistance can be ensured because the number of charging trays 20 does not exceed a predefined or predefinable limit value. For example, the sum of the contact resistances via the chain of charging trays 20 may not exceed a limit value of 200 mW in case of a looped-through power supply voltage $U_V$ as well as a looped-through protective ground wire. This can be achieved by the number of charging trays 20 being limited. A reference for the correct use of the multi-charger 10 and of the charging trays 20, for example, in the form of a textual reference on each charging tray 20, is not sufficient to meet the requirements of electrical safety.

Each charging tray 20 can communicate with a possible predecessor or successor along the line of charging trays by means of the signal transmitter 42 and the signal receiver 44. Each charging tray 20 communicates to a successor along such a line its position in the line, for example, by communicating to the successor how many predecessors the line comprises.

Figure 5:
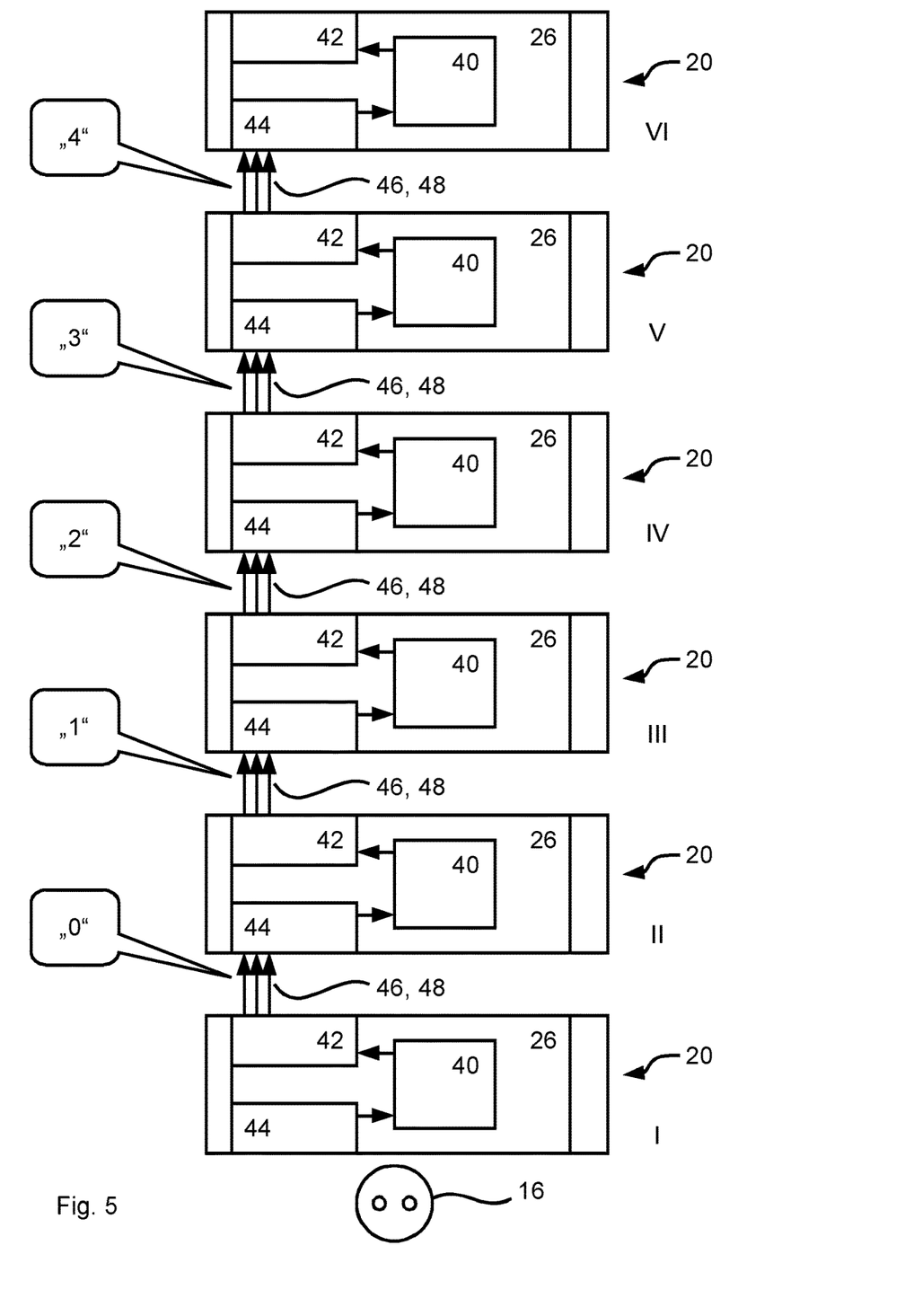
FIG. 5 is a line of a plurality of interconnected charging devices (line of charging devices) as well as signals transmitted between the charging devices.

A line of charging trays comprising a plurality of charging trays 20 is shown in a schematically highly simplified manner in the view in FIG. 5. The view of the individual charging trays 20 is limited to the view of the charging tray circuit 26, the transmitter 42 and the receiver 44 comprised by the charging tray circuit 26 as well as the microcontroller 40. On the right, next to each charging tray 20 of the line of charging trays, is indicated (in Roman numerals) the position thereof in the line of charging trays as viewed from the feeding network 16. For precisely designating a certain charging tray 20 in the line of charging trays, this charging tray is designated below correspondingly as "first charging tray," "second charging tray," etc. corresponding to its respective position.

By means of its signal receiver 44, each charging tray 20 is capable of receiving signals 48 from a possible predecessor along a line of charging trays. The charging tray 20 connected directly to the feeding network 16 receives no signals 48 via its signal receiver 44. By analyzing the status of the signal receiver 44 by the microcontroller 40, this charging tray 20 accordingly automatically detects that it is connected directly to the network 16 and that it is accordingly the first charging tray 20 in the line of charging trays. The microcontroller 40 of this charging tray 20 thereupon actuates the signal transmitter 42 of this charging tray 20 to send a signal 46 coding this position of this charging tray 20. This is shown in the view in FIG. 5 by means of a text balloon and the text "0." This graphically shows that the signal sent from the charging tray 20, and more precisely to the signal transmitter 42 of the charging tray circuit 26, comprises the information in coded form that the charging tray 20 transmitting the signal 46 does not precede an additional charging tray 20 in the line of charging trays ("0" denotes the number of predecessors of the charging tray 20 in the direction towards the feeding network 16) and that this is consequently the first charging tray 20 in the line of charging trays.

The charging tray 20 connected directly to the first charging tray 20, i.e., the second charging tray 20 along the line of charging trays, receives the signal 46 sent by the first charging tray 20 by means of its signal receiver 44 as an input signal 48. On the basis of the received signal 48, this charging tray 20 detects that it has precisely one predecessor along the line of charging trays, namely the first charging tray 20. Consequently, this charging tray 20 automatically detects that it is the second charging tray 20 along the line of charging trays. Correspondingly, the second charging tray 20 sends a signal 46, which codes this position and the number of predecessors (shown by means of the text balloon with the text "1" in the view in FIG. 5).

The charging tray 20 connected directly to the second charging tray 20, i.e., the third charging tray 20 along the line of charging trays, receives this signal 46 by means of its signal receiver 44 as input signal 48. On the basis of the received signal 48, this charging tray 20 detects that it has precisely two predecessors along the line of charging trays, namely the first charging tray 20 and the second charging tray 20. Consequently, this charging tray 20 automatically detects that it is the third charging tray 20 along the line of charging trays. Correspondingly, the third charging tray 20 sends a signal 46, which codes this position and the number of predecessors (shown by means of the text balloon with the text "2" in the view in FIG. 5).

The above-described reception of the signal 46 sent by the respective, directly preceding charging tray 20, the analysis of which as received signal 48 for the determination of its own position in the line of charging trays as well as for the generation and sending of a signal 46 coding its own position in the respective line of charging trays correspondingly applies to the additional charging trays 20 in the line of charging trays.

The microcontroller 40 of each charging tray 20 monitors the number of respective predecessors coded in the form of the respective input signal 46. As soon as a predefined or predefinable limit value is reached or exceeded, the microcontroller 40 deactivates at least the charging controller 32 of the respective charging tray 20 and/or activates the charging controller status display 38 for signaling an error situation. When the microcontroller 40 activates only the charging controller status display 38, it is up to the user again to remove a battery pack 12 possibly connected to the charging tray 20 or to separate the charging tray 20 from the line of charging trays. When the microcontroller 40 only deactivates the charging controller 32, the user notices the charging not carried out possibly only if the battery pack 12 shall be used. Hence, the preferred embodiment is that the microcontroller 40 deactivates the charging controller 32 of the respective charging tray 20 and activates the charging controller status display 38 for signaling an error situation. All possible above-mentioned variants are designated individually and jointly briefly as deactivation of the charging tray 20 in the interest of readability of the specification submitted here. This is expressed in a different wording to the effect that the respective charging tray 20 is deactivated automatically, namely under the control of its microcontroller 40.

The signal 46 sent for wireless data transmission and the input signal 48 are IR signals 46, 48 in an IR transmitter 42 and correspondingly an IR receiver 44. Other frequency ranges for the wireless transmission from one charging tray 20 to a directly adjacent charging tray 20 are also conceivable and shall with this reference be considered to be covered by the specification submitted here.

In case of an IR signal 46, 48, the sent signal 46 is, for example, modulated up to a carrier frequency, for example, a carrier frequency of 38 kHz. The modulation takes place, for example, as amplitude modulation. The first charging tray 20 (connected directly to the network 16) sends, for example, as output signal 46 a signal with a frequency of 200 Hz (transmission frequency), which is modulated up to the respective carrier frequency. The frequency 200 Hz codes the position of the first charging tray 20 in the line of charging trays. Correspondingly, the second charging tray 20 uses a different frequency, for example, a frequency of 400 Hz. The frequency 400 Hz codes the position of the second charging tray 20 in the line of charging trays. This correspondingly applies to the third charging tray 20 and additional charging trays 20, so that these charging trays use, for example, the frequencies 600 Hz, 800 Hz, etc. The frequencies are selected such that a sufficient distance is given for a clear identification of the respective, coded position when a charging tray 20 analyzes a signal 46 sent by a preceding charging tray 20 as an input signal 48. Optionally, a certain bandwidth about the individual transmission frequencies is taken into consideration in the analysis, as this is shown in the table below for the frequencies mentioned above as examples (corresponding, different conditions result in case of other transmission frequencies):

| Received frequency | Number of predecessors in the line of charging trays | Transmission frequency | Coded position |
|---|---|---|---|
| 0-100 Hz | 0 | 200 Hz | "0" |
| 100-300 Hz | 1 | 400 Hz | "1" |
| 300-500 Hz | 2 | 600 Hz | "2" |
| 500-700 Hz | 3 | 800 Hz | "3" |
| 700-900 Hz | 4 | 1,000 Hz | "4" |
| >900 Hz | >=5 | 1,000 Hz | "4" |

The table assumes that the above-mentioned limit value allows precisely five charging trays 20 in the line of charging trays. Depending on a concrete embodiment, provisions may be made for a sixth or additional charging tray 20 possibly connected to the line of charging trays to transmit a signal 46, which codes the respective position in the line of charging trays or—as indicated in the table—the last position allowed according to the limit value. In both cases, another possibly following charging tray 20 receives a signal 48, which leads to deactivation of this charging tray 20.

The position-dependent (position in the line of charging trays) deactivation of possibly too many connected charging trays 20 allows the modular lining up of a plurality of charging trays 20 on the line of charging trays until a maximum number of charging trays 20 defined by the respective limit value is reached. When this maximum number is exceeded, the charging trays 20 remain ready for operation within the limit value and battery packs 12 connected to them continue to be charged. A total switching off of the multi-charger 10 thus does not take place. The operating safety of the multi-charger 10 is guaranteed by the position-dependent deactivation of the or each too-many connected charging tray 20.

Individual aspects of the specification submitted here which have priority can thus be summarized as follows: A charging device 20, configured, for example, as a charging tray 20, for charging a battery pack 12, which is combinable with other charging devices 20 to form a multi-charger 10, as well as a method for the operation of such a charging device 20 and a multi-charger 10 formed with a plurality of charging devices 20 are indicated. The charging device 20 has an input-side contact element 22 for the connection of a power cable 14 or an additional charging device 20 as well as internally conductors for the electrically conductive connection of the input-side contact element 22 to an output-side contact element 24 and for looping through a power supply voltage $U_V$ in contact with the input-side contact element 22. A charging device circuit 26 is connected to the looped-through power supply voltage $U_V$ within the charging device. The connection thereof to the power supply voltage $U_V$ takes place by means of an input-side voltage converter 30. This voltage converter 30 converts the power supply voltage $U_V$ into a supply voltage for feeding a charging controller 32 of the charging device circuit 26. To limit the number of charging devices 20 that can be connected to one another, each charging device 20 is intended and set up, on the one hand, for the transmission of a signal 46, which codes a position of the charging device 20 in a line of charging devices comprising a plurality of charging devices 20, and, on the other hand, for comparison of the position coded by the signal 46 with a predefined or predefinable limit value as well as for deactivation of the charging device 20 upon reaching the limit value.

While specific embodiments of the invention have been shown and described in detail to illustrate the application of the principles of the invention, it will be understood that the invention may be embodied otherwise without departing from such principles.

APPENDIX

List of Reference Numbers

10 Multi-charger
12 Battery pack
14 Power cable
16 Network
18 (blank)
20 Charging device, charging tray
22 (input-side) contact element
24 (output-side) contact element
26 Charging device circuit, charging tray circuit
28 (blank)
30 Voltage converter
32 Charging controller
34 Precharging circuit
36 Explosion protection circuit
38 Charging controller status display
40 Microcontroller
42 Signal transmitter; IR transmitter
44 Signal receiver; IR receiver
46 (sent) signal; IR signal
48 (received) signal; IR signal

What is claimed is:

1. A charging device for charging at least one battery pack, the charging device comprising:
a charging device structure configured to charge the at least one battery pack, the charging device structure being further configured to be arranged in a line with one or more charging devices comprising other charging device structures for charging other battery packs, the charging device structure being further configured to be in series with the other charging device structures and in communication only with the other charging device structures, the charging device structure comprising:
an input-side contact element configured as a power cable connection or an additional charging device connection or both as a power cable connection and an additional charging device connection;

an output-side contact element configured to be connected electrically conductively to an input-side contact element of an additional charging device;

internal conductors configured to provide an electrically conductive connection of the input-side contact element to the output-side contact element and for passing through a power supply voltage in contact with the input-side contact element;

a charging device circuit internally connected to the power supply voltage, the charging device circuit comprising a voltage converter on a charging device circuit input side and a charging controller for charging the at least one battery pack, wherein the power supply voltage can be converted by means of the voltage converter into a supply voltage for feeding the charging controller;

a device positioning configuration configured for transmitting a signal to an adjacent one of the other charging device structures for charging one of the other battery packs, which codes a position of the charging device relative to the other of charging device structures; and a comparison device configured to compare the position coded by the signal with a predefined or predefinable limit value and for a deactivation of the charging device upon reaching the limit value.

2. The charging device in accordance with claim 1, wherein the signal codes a number of the charging devices in the line of charging devices preceding the charging device on the input side.

3. The charging device according to claim 1, wherein:
the device positioning configuration and the comparison device comprise a microcontroller, a signal transmitter and a signal receiver;
the signal, which codes the position of the charging device in the line of charging devices comprising the plurality of charging devices, is generated by the microcontroller; and
the signal, which is received by another charging device for the reception of the coded position and for comparison with the limit value, is analyzed by the microcontroller.

4. The charging device in accordance with claim 1, wherein the limit value corresponds to a maximum number of connected charging devices, the device positioning configuration being configured to transmit the signal to another one of the connected charging devices.

5. The charging device in accordance with claim 1, further comprising:
a signal transmitter configured for a wireless transmission of the signal to a charging device following on the output side; and
a signal receiver configured for the wireless reception of a preceding signal transmitted to a charging device preceding the charging device on the input side.

6. The charging device in accordance with claim 5, wherein the signal transmitter comprises an infrared transmitter and the signal receiver comprises an infrared receiver.

7. The charging device in accordance with claim 1, wherein:
the charging device is configured as a charging tray defining a region for receiving the at least one battery pack;
the charging controller comprised by the charging tray is deactivatable for a deactivation of the charging device.

8. The charging device in accordance with claim 7, further comprising a charging controller status display comprised by the charging tray, the charging controller status display being activated for signaling an error situation for the deactivation of the charging device.

9. A method for the operation of a multi-charger, the method comprising the steps of:
connecting a plurality of charging devices to one another electrically conductively for charging at least one battery pack, each charging device comprising an input-side contact element configured as a power cable connection or an additional charging device connection or both as a power cable connection and an additional charging device connection, an output-side contact element configured to be connected electrically conductively to an input-side contact element of an additional charging device, internal conductors configured to provide an electrically conductive connection of the input-side contact element to the output-side contact element and for passing through a power supply voltage in contact with the input-side contact element, a charging device circuit internally connected to the power supply voltage, the charging device circuit comprising a voltage converter on a charging device circuit input side and a charging controller for charging the at least one battery pack, wherein the power supply voltage can be converted by means of the voltage converter into a supply voltage for feeding the charging controller, a device positioning configuration transmitting a signal, which codes a position of the respective charging device in a series of charging devices comprising the plurality of charging devices and a comparison device comparing the position coded by the signal with a predefined or predefinable limit value and for a deactivation of the respective charging device upon reaching the limit value;
with each said charging device, transmitting the signal, which codes the position of each charging device in the line of charging devices comprising the plurality of charging devices, to the charging devices connected on the output side, wherein the plurality of charging devices only communicate with each other;
with the comparison device of each charging device, comparing the position coded by the signal with the predefined or predefinable limit value and deactivating the respective charging device upon reaching the limit value.

10. The method in accordance with claim 9, wherein:
the signal codes a number of charging devices preceding the charging device in the line of charging devices on the input side; and
each charging device compares the number coded by the signal with the predefined or predefinable limit value and is deactivated upon reaching the limit value.

11. The method in accordance with claim 9, wherein:
each charging device comprises a microcontroller, a signal transmitter and a signal receiver for carrying out the method steps; and
the signal, which codes the position of the charging device in the line of charging devices comprising the plurality of charging devices is generated by the microcontroller; and
the signal received by another charging device for the reception of the coded position and for comparison with the limit value is analyzed by the microcontroller.

12. The method in accordance with claim 9, wherein the limit value corresponds to a maximum number of connected charging devices, the signal only being transmitted to another one of the charging devices, wherein the another one of the charging devices determines a position of the another one of the charging devices in the series of the charging devices based on the signal transmitted to the another one of the charging devices.

13. A multi-charger comprising a plurality of charging devices for charging a plurality of battery packs, the plurality of charging devices only communicating with one another, each charging device comprising:
- an input-side contact element configured as a power cable connection or an additional charging device connection or both as a power cable connection and an additional charging device connection;
- an output-side contact element configured to be connected electrically conductively to an input-side contact element of an additional charging device for charging another one of the plurality of battery packs;
- internal conductors configured to provide an electrically conductive connection of the input-side contact element to the output-side contact element and for passing through a power supply voltage in contact with the input-side contact element;
- a charging device circuit internally connected to the power supply voltage, the charging device circuit comprising a voltage converter on a charging device circuit input side and a charging controller for charging at least one battery pack, wherein the power supply voltage can be converted by means of the voltage converter into a supply voltage for feeding the charging controller;
- a device positioning configuration configured to transmit a signal, which codes a position of the charging device in a series of charging devices comprising a plurality of charging devices; and
- a comparison device configured to compare the position coded by the signal with a predefined or predefinable limit value and for a deactivation of the charging device upon reaching the limit value.

14. The multi-charger in accordance with claim 13, wherein the signal codes a number of charging devices of said plurality of charging devices in the series of charging devices preceding the charging device on the input side, the charging device only transmitting the signal to the additional charging device.

15. The multi-charger in accordance with claim 13, wherein:
- the device positioning configuration and the comparison device comprise a microcontroller, a signal transmitter and a signal receiver;
- the signal, which codes the position of the charging device in the line of charging devices comprising the plurality of charging devices, is generated by the microcontroller; and
- the signal, which is received by another charging device for the reception of the coded position and for comparison with the limit value, is analyzed by the microcontroller.

16. The multi-charger in accordance with claim 13, wherein the limit value corresponds to a maximum number of connected charging devices, the device positioning configuration being configured to transmit the signal to another one of the charging devices, wherein the another one of the charging devices determines a position of the another one of the charging devices in the line of the charging devices based on the signal transmitted to the another one of the charging devices.

17. The multi-charger in accordance with claim 13, further comprising:
- a signal transmitter configured for a wireless transmission of the signal to a charging device following on the output side; and
- a signal receiver configured for the wireless reception of a preceding signal transmitted to a charging device preceding the charging device on the input side.

18. The multi-charger in accordance with claim 17, wherein the signal transmitter comprises an infrared transmitter and the signal receiver comprises an infrared receiver.

19. The multi-charger in accordance with claim 13, wherein:
- the charging device is configured as a charging tray with a battery pack interface;
- the charging controller comprised by the charging tray is deactivatable for the deactivation of the charging device.

20. The multi-charger in accordance with claim 19, further comprising a charging controller status display comprised by the charging tray, the charging controller status display being activated for signaling an error situation for the deactivation of the charging device.

* * * * *